United States Patent [19]
Cochran et al.

[11] Patent Number: 5,953,859
[45] Date of Patent: Sep. 21, 1999

[54] RECHARGEABLE LIVE PLANTER ASSEMBLY AND METHOD OF USE THEREOF

[75] Inventors: Bradley M Cochran, Royal Oak; Brian M Cochran, Madison Heights; Brandon M Cochran; Robert B Cochran, both of Royal Oak; John J Nederlander, Troy; Paul L Nine; Frank Marra, both of Bloomfield Hills; Brett M Cochran, Madison Heights, all of Mich.

[73] Assignee: Insta-Bed Floral Systems, Madison Heights, Mich.

[21] Appl. No.: 08/927,768

[22] Filed: Sep. 11, 1997

Related U.S. Application Data

[60] Provisional application No. 60/028,862, Oct. 16, 1996.
[51] Int. Cl.[6] .................................................. A01G 9/02
[52] U.S. Cl. .............................. 47/66.5; 47/41.1; 47/86
[58] Field of Search .................................. 47/66.5, 86, 87, 47/39, 41.1, 75, 41.14

[56] References Cited

U.S. PATENT DOCUMENTS

| | | | |
|---|---|---|---|
| 84,002 | 11/1868 | Ryder . | |
| 1,981,640 | 11/1934 | Baker et al. | 47/41 |
| 2,029,314 | 2/1936 | Ellis | 47/41 |
| 2,857,862 | 10/1958 | Dwyer | 110/18 |
| 3,076,289 | 2/1963 | Gallo | 47/39 |
| 3,302,324 | 2/1967 | MacDonald et al. | 47/34 |
| 3,707,806 | 1/1973 | Toews et al. . | |
| 4,205,485 | 6/1980 | Olsen | 47/39 X |
| 4,213,274 | 7/1980 | Skaife | 47/86 X |
| 4,306,376 | 12/1981 | Strassacker et al. | 47/41.1 |
| 4,428,168 | 1/1984 | Tomer | 52/104 |
| 4,594,646 | 6/1986 | Von Kohorn et al. | 362/101 |
| 4,631,859 | 12/1986 | Letter et al. | 47/41.1 |
| 4,785,578 | 11/1988 | Grene | 47/86 |
| 5,022,183 | 6/1991 | Bohlmann | 47/86 |
| 5,044,120 | 9/1991 | Couch | 47/75 X |
| 5,103,587 | 4/1992 | Holler | 47/75 |
| 5,199,213 | 4/1993 | Krebs et al. | 47/39 |
| 5,409,510 | 4/1995 | Houweling | 47/39 X |

*Primary Examiner*—Danton D. DeMille
*Assistant Examiner*—Yvonne R. Abbott
*Attorney, Agent, or Firm*—Young & Basile, P.C.

[57] ABSTRACT

An apparatus for storing decorative plants, particularly, in earth, while allowing for easy removal and replacement of the stored plants, includes a receptacle body which is embedable in the earth, the receptacle body having at least one cavity formed therein for receiving a storage tray, the receptacle body further having a hole formed therethrough below the cavity to allow drainage therefrom. A storage tray is shaped to fit inside the cavity of the receptacle body, and the storage tray has a hollow space formed therein to receive stored plants such as flowers therein. Among other uses, the apparatus hereof is suitable for replaceably holding flowering plants at grave sites, and elsewhere where flower beds are desired.

4 Claims, 2 Drawing Sheets

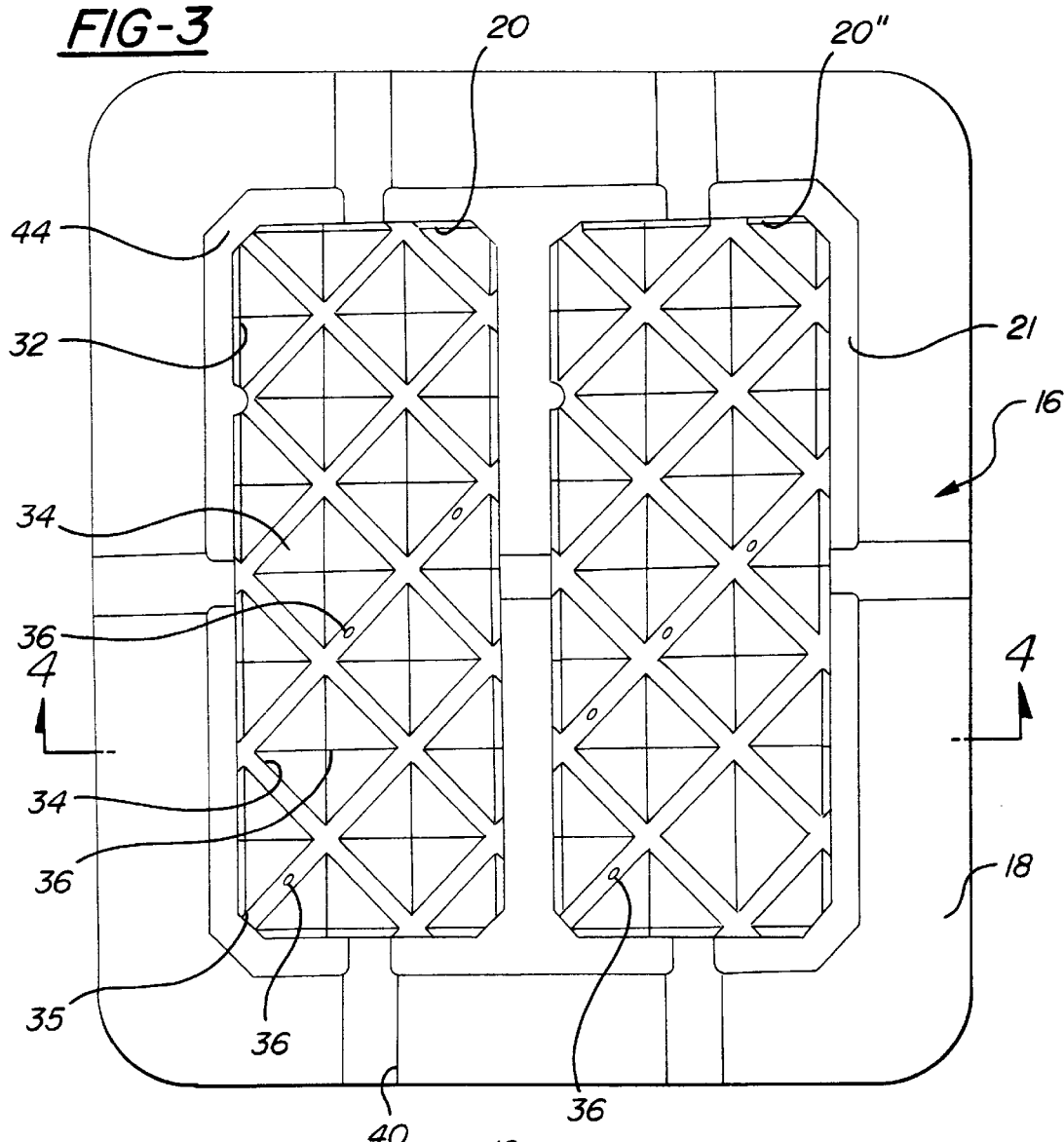
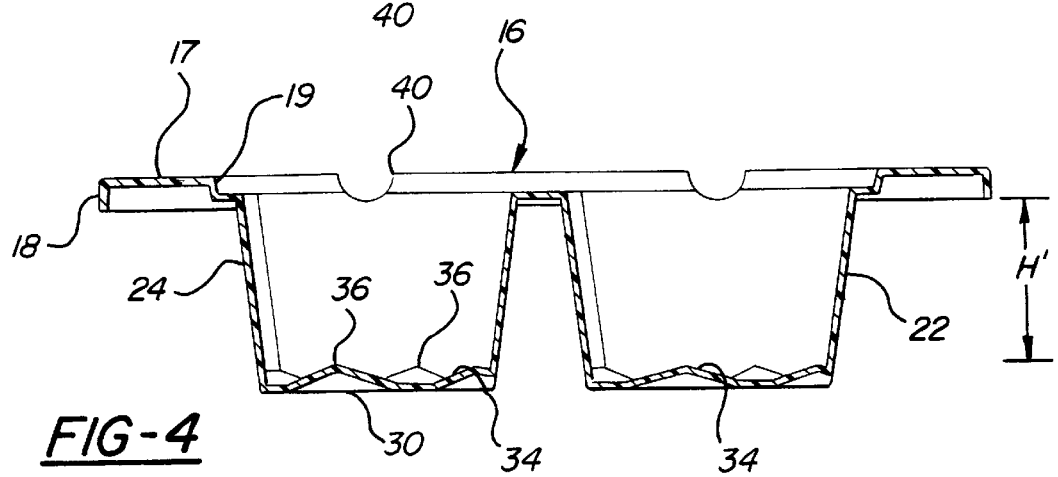

RECHARGEABLE LIVE PLANTER ASSEMBLY AND METHOD OF USE THEREOF

This application is a complete application emanating from co-pending U.S. Provisional Application No. 60/028,862, filed Oct. 16, 1996, the disclosure of which is incorporated herein by reference; and to a currently filed application, Ser. No. 08/927,849 entitled "Renewable In-Ground Planting Apparatus and Methods of Making and Using Same".

FIELD OF THE INVENTION

This invention relates to rechargeable in-ground planter assemblies of the type comprising permanently installed receptacles having a peripheral flange which, when installed, is flush with the surface of the earth. The invention further comprises one or more inserts which are precharged with plant life and growing soil and which can be easily installed in and removed from the receptacle.

BACKGROUND OF THE INVENTION

It is common practice to place wreaths, potted plants and cut flowers on and around graves and burial areas in remembrance of deceased persons. It is also common practice, albeit somewhat less so, to plant live flowers on and around graves. There are disadvantages associated with all of these approaches; e.g., cut flowers have only temporary value; potted plants may be stolen or strewn about by wind and animals; planted live flowers are attractive but typically bloom only once a season and require substantial effort to install, replace and maintain.

The prior art includes arrangements by which a receptacle may be permanently installed in the ground so as to receive an insert which may be removed from time to time. The U.S. Pat. No. 1,981,640 to Baker et al. discloses such an arrangement wherein the insert comprises a vase which is adapted to receive cut flowers. The patent to Ellis, U.S. Pat. No. 2,029,314 discloses an arrangement having telescopic circular canisters.

SUMMARY OF THE INVENTION

The present invention provides an improved apparatus for holding plants and flowers which look semi-permanent when in place, but which allows for rapid removal and replacement of the flora as needed or desired. The invention also facilitates maintenance of the flora and surrounding ground.

An apparatus according to the present invention generally includes a receptacle body for embedding in earth to receive decorative plants and flora therein, the receptacle body having at least one open top recess or depression formed therein for receiving a plant storage container. In a preferred embodiment of the invention, the receptacle body has a substantially non-planar lower floor therein below the upper rim of the cavity, the floor of the receptacle body having a plurality of high and low spots formed thereon for supporting a lower surface of a plant storage container thereon, the floor of the receptacle body further having at least one hole formed therethrough to allow drainage.

In a preferred embodiment of the invention, the apparatus further includes a storage tray shaped to fit inside the cavity of the receptacle body, the storage tray having a hollow space formed therein to receive soil, plants and flowers therein.

Accordingly, it is an object of the present invention to provide an apparatus for placing live plants and flowers in the earth below ground level with a substantially permanent appearance, while allowing for quick and easy removal and replacement of those plants and flora and while requiring no digging or planting.

For a more complete understanding of the present invention, the reader is referred to the following detailed description, which should be read in conjunction with the accompanying drawings. Throughout the following detailed description and in the drawings, like numbers refer to like parts, in which:

BRIEF DESCRIPTION OF THE DRAWINGS

FIG. 3 is a top plan view of a fixed element of the apparatus of FIG. 2; and

FIG. 4 is a cross-sectional view taken along the line 4—4 of FIG. 3.

DESCRIPTION OF THE PREFERRED EMBODIMENT

Figure 1:
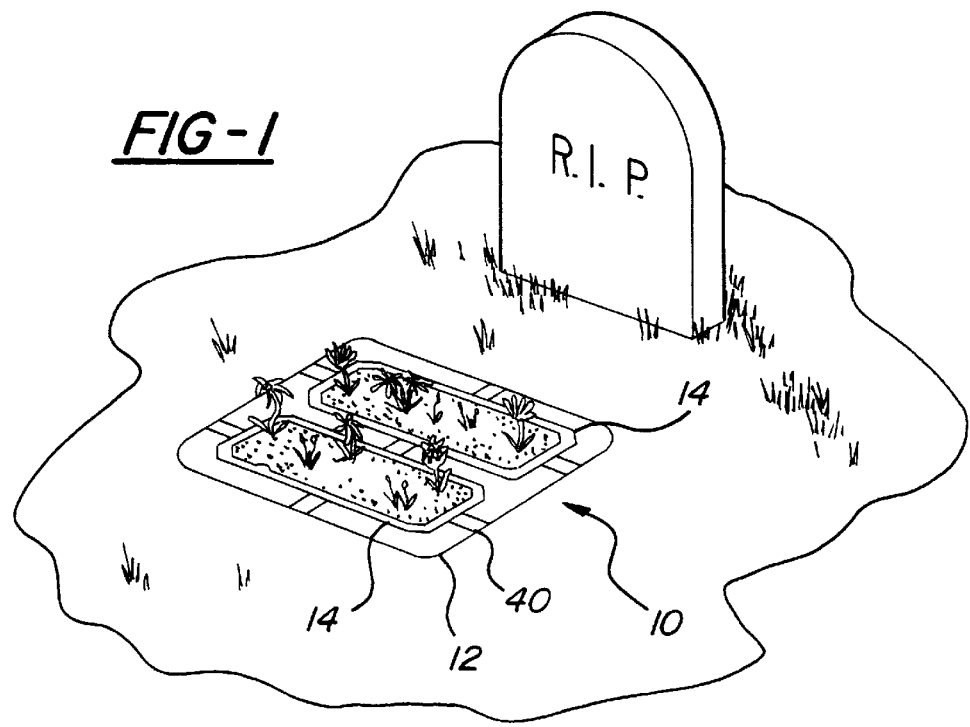
FIG. 1 is an environmental perspective view of a plant storage apparatus in accordance with the present invention, shown installed at a grave site and containing flower plants therein.
Figure 2:
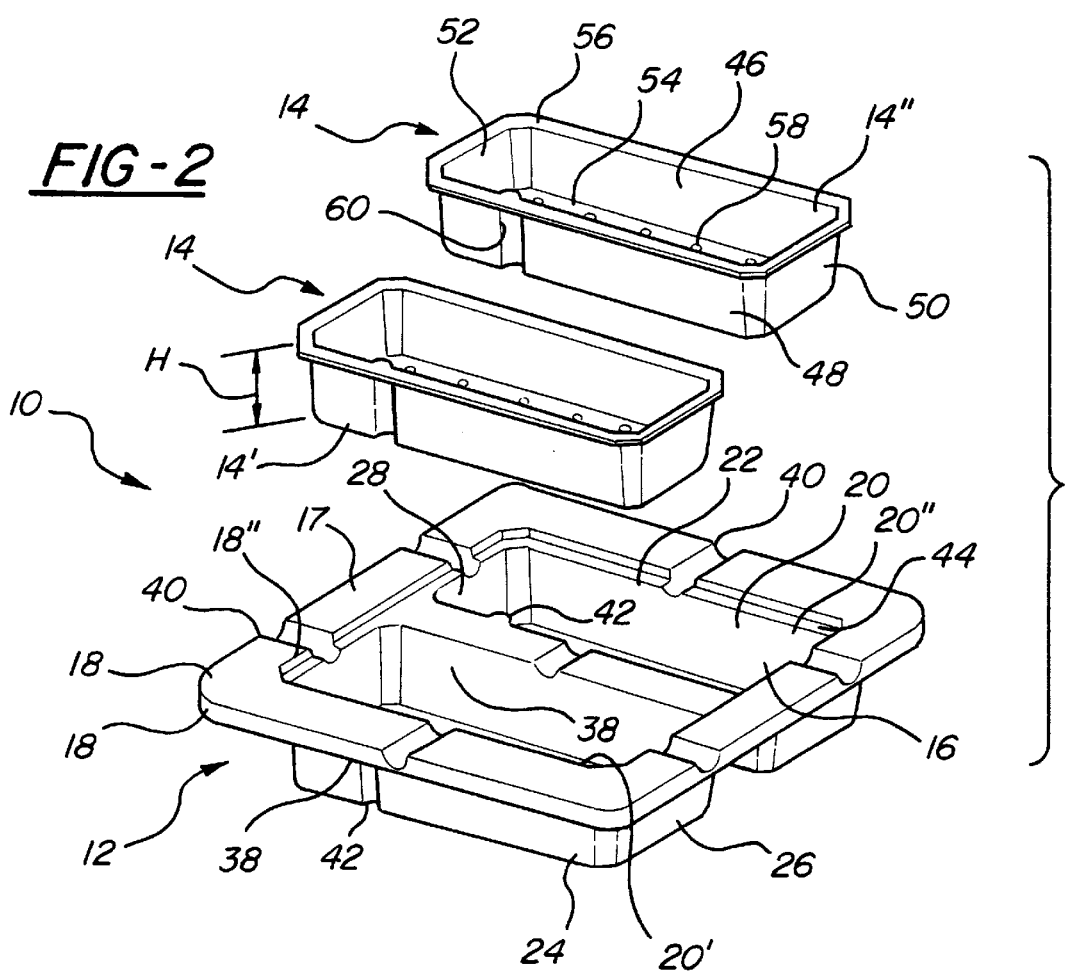
FIG. 2 is an exploded perspective view of the apparatus of FIG. 1.

Referring now to the drawing, a planting apparatus in accordance with the present invention, for creating a replaceable plant display or flower bed, is shown generally at 10. The apparatus 10 hereof, in a preferred embodiment, includes separable components or elements including a fixed component or receptacle 12, and at least one removable component or tray 14. The removable component 14 nests within the fixed component 12, as will be described in detail herein.

With more particularity, the fixed component 12 includes a receptacle body 16 formed as an integral unit from a durable material, such as weather-resistant plastic, cement, or the composition sold under the mark GEOBOND. The exact material is not critical hereto, only that it be non-corrosive, non-degradable and dimensionably stable over a wide temperature range, i.e., from extreme cold to high heat as is environmentally encountered.

The receptacle body 15 includes a perimeter rim 17 having an outer edge 18 and an inner edge 19. The receptacle body 16 also has at least one recess or cavity 20 formed therein, with a flat narrow ledge 21 formed therearound which extends horizontally inwardly from the interior edge 19 of the rim 17. The ledge 21 defines a shoulder for removably seating either the removable tray 14, or, alternatively, a lid (not shown) thereon. The lid is used to cover the apparatus, when necessary, and as discussed below.

The receptacle body 16 further has slightly inwardly tapering side walls 22, 24 disposed on opposite sides of the cavity 20, and end walls 26, 28 located at opposite ends thereof, as shown. Each of the walls 22, 24, 26, and 28 depend from and are integrally formed with the rim 17.

A floor extends substantially horizontally across the receptacle body 16 from the lower ends of the walls 22, 24, 26, 28 at the bottom of the cavity 20. The floor 30 is provided with a non-planar grid 32, which is preferably a lattice made up of a plurality of flat sided pyramids 34 uniformly spaced through the area of the grid.

Each pyramid 34 has a high spot or apex 36, from which pyramid walls 35 slope outwardly and downwardly to the base or floor 30. The area of the floor 30 between the pyramids 34 forms a channel 37, and the channel preferably has a plurality of apertures or holes 38 formed therethrough to permit fluid, such as water, to drain outwardly from the receptacle body 16. The apices 36 of the pyramids work together with the channel 37 to prevent the removable tray 14 from "freezing" to the floor 30 of the fixed component 12.

In practicing the present invention, a hole is dug in the ground and the fixed component 12 is placed in the hole in a position so that the rim 17 is at ground level. In this way, the fixed component 12 is embedded in the ground and is permanently seated therein. Also, and as shown in the drawing, at least one aperture 39 may be provided in either one of the side walls 22, 24 or end walls 26, 28, through which one or more spikes or the like (not shown) may be driven horizontally therethrough into the earth to fix the component 12 in the place in the ground.

Also in the preferred embodiment of the present invention, the perimeter rim 17 may have at least one indentation 40 formed therein to enable and facilitate a user's grasping of the removable tray 14 when it is seated within the cavity 20.

It is further contemplated herein, although not critical to the practice of the present invention, that an embossment or rib 42 be provided at least partially along the vertical extent of any one of the walls 22, 24, 26, and 28. The embossment 42, as described hereinafter, cooperates with a groove or recess formed in the removable tray 14 to lock it in place in the cavity 20 of the fixed component 12.

As noted hereinabove, the removable tray 14 hereof provides a nestable open top container for placement within the cavity 20 of the fixed component 12. The removable tray 14 is preferably formed from a durable and weather-resistant plastic, and is sized to fit snugly within the cavity 20. The tray 14 defines a hollow interior storage area 44 bounded by two substantially vertical spaced apart side walls 46, 48 two substantially vertical spaced apart end walls 50, 52, and a floor 54 attached to the side and end walls 46, 48, 50, 52 at their lowermost edges, and being integrally formed therewith to provide a unitary, open topped container. The tray 14 further includes a rim 56 attached to and extending horizontally outwardly from the top of the walls 46, 48, 50, 52 as shown. When the tray 14 is inserted into the cavity 20 of the fixed component 12, the rim 56 seats on the shoulder provided by the ledge 21 (FIG. 1).

Each of the walls 46, 48, 50, 52 of the tray 14 has a height H which is equal in dimension to the depth D of the cavity 20 in the receptacle body 16, which is the distance from the ledge 21 to the apices 36 of the pyramids 34. Thus, when the tray 14 is seated within the cavity 20 the rim 56 rests on the ledge 21, as noted, while the floor 54 rests on the plane defined by the pyramidal apices 36. Because of the vertical distance between the floor 30 of the fixed component 12 and the floor 54 of the tray 14, any fluid, such as water, which builds up on the floor of the fixed component will not, under most circumstances, abut against the exterior surface of the tray floor 54 and thus, the tray will not freeze to the floor 30 of the fixed component.

The floor 54 of the tray 14 preferably has a plurality of apertures 58 formed therethrough to allow fluid, such as water, to drain therethrough.

Optionally, at least one of the side walls and/or end walls 46, 48, 50, 52 of the tray 14 has a recess 60 formed therein which is substantially equal in length and diameter to that of the embossment 42 provided in a corresponding wall of the fixed component 12. The recess 60 provides a guideway for the embossment 40 to properly orient and interlock the tray 14 into the fixed component 12.

As is shown in the drawing, the rim 56 when seated on the ledge 21, may be grasped by a user by inserting a finger into the indentation 40, and by grasping the rim 56 between the finger and the thumb, the tray 14 may be removed from the cavity 20.

Clearly, from the preceding, it is to be appreciated that in use, the tray 14 is inserted into the cavity 20 and is seated therewithin.

In the practice of the present invention, the tray 14 is filled with dirt and flowers or other decorative plants in a remote location such as a backyard, greenhouse or nursery, either by horticulture professionals or by the owner thereof, and is then transported to the point of end use where the fixed component 12 is located. Then, if necessary, any old plants are removed by removing the old tray 14 in which they are housed, and the fresh tray 14 is installed in its place. In this way, the difficulty and mess of preparing flower beds at the point of use is minimized.

As shown in FIG. 1, the present invention has particular utility in preparing cemetery beds for grave sites. By placing the fixed component 12 in the ground, flower beds for the cemetery plots are easily provided, and are easily removed and replaced as desired.

In the preferred construction, each of the fixed and removable components 12, 14 is made of a durable plastic which is resistant to corrosion from acids contained in the soil, and which has a sufficient strength so that it may be trod upon or driven over. Suitable materials include nylon, polycarbonate, high density polyethylene and the like. Alternatively, the removable component 14 may be formed from a biodegradable material which may then be mulched or composted with the organic matter contained in the flower bed, including any dead flowers as well as the soil, and subsequently may be reused.

As noted, in preparing a flower bed, the previously prepared tray 14 containing flowers and dirt is merely inserted into the cavity 20. After the flowers have frozen and the flower beds are to be prepared for the next season, or when the owner of the site wishes to make a change of the plants on display, the removable component can be removed from the cavity and a new one inserted in its place. Alternatively, the tray 14 may be removed from the cavity and may then be dumped out in a suitable area, and new dirt and plants may be planted therein, followed by reinstallation in the cavity of the fixed component 12.

In fabricating and using the apparatus 10 of the present invention, in the preferred embodiment thereof, preferably, the fixed component 12 includes a multi-compartmented cavity having at least two compartments 20 and 20' for removably storing at least two removable trays 14 and 14', each configured substantially similarly, as shown in the drawings. Of course, more than two compartments may be used with a corresponding number of removable components.

The removable components 14, as well as the fixed components 12, are each, respectively, dimensioned to be nestably stacked for storage when not in use.

It should be further noted with respect hereto that although the floor of the fixed component 12 has been described herein as one having a closed surface with apertures formed therethrough, clearly, an open grid or the like may be used.

As noted hereinabove, it is also contemplated that a lid (not shown) also be provided. Oftentimes, in preparing grave sites, they are formed adjacent already existing cemetery plots. It is contemplated herein that where a tractor or the like has to be used adjacent an existing cemetery plot, the lid is placed over the fixed component 12. In use, the tray 14 is manually removed from its associated cavity and the lid is then seated on the ledge 21. The lid is formed from a sufficiently durable material that the tractor may be driven thereover without destroying the integrity of the flowers, as well as of the flower bed itself. After the new grave site is prepared, the lid may be removed and the flower-bearing tray replaced in the cavity 20.

It is, also, contemplated to use the present invention to provide grave blankets. In doing so, the removable components are replaced with conventional foam blocks which fit in the cavities. A grave blanket (not shown) may then be hooked or otherwise secured to the blocks.

It is to be appreciated that the present invention is not necessarily limited to grave sites, but may be used in other commercial, as well as residential environments and could be used above-ground, if desired. It is further to be appreciated from the preceding description that the present invention affords a device for creating a flowerbed or plant display which enables easy maintenance and removal of flora stored therein.

In another application of the present invention, the apparatus hereof contains a fixed component 12 as shown and described herein, and the fixed component is permanently embedded in the earth, as discussed, but instead of placing the removable component 14 therein, rather, the fixed component is dimensioned to hold and receive a series of standard cylindrical plastic flower pots therein, such as are commonly commercially available, with growing plants disposed in the flower pots.

Although the present invention has been described herein with respect to a preferred embodiment thereof, the foregoing description is intended to be illustrative, and not restrictive. Those skilled in the art will realize that many modifications of the preferred embodiment could be made and would be operable. All such modifications which are within the scope of the following claims are intended to be within the scope and spirit of the present invention.

We claim:

1. A method of providing decorative plant life in designated areas comprising the steps of:

providing a receptacle of durable, substantially rigid material having a depth of at least about five inches, at least one lateral dimension substantially greater than five inches, an open top having a perimeter flange and at least one drain opening;

embedding the receptacle in the earth with the perimeter flange substantially flush with the surface of the earth;

providing an insert of a durable material of a size and shape which is complemental to and fitting within at least a portion of the receptacle and having a depth of about at least five inches;

said insert having an open top adapted to be substantially flush with the perimeter flange of the receptacle when placed therein, and at least one drain opening;

filling the insert with soil and plant life rooted in said medium; and placing said insert in said receptacle.

2. The method of claim 1 further including the additional steps of:

providing a second insert essentially identical in physical characteristics to said first named insert;

filling the second insert with soil and plant life rooted in said soil;

removing the first named insert from the receptacle; and placing the second insert into the receptacle in place of the first named receptacle.

3. A method as described in claim 1 wherein the insert is provided with a peripheral flange which, when the insert is placed into the receptacle, overlies and contacts the peripheral flange of the receptacle.

4. A method as defined in claim 3 wherein the receptacle peripheral flange is recessed to receive the peripheral flange of an insert.

* * * * *